(12) United States Patent
Suzuki et al.

(10) Patent No.: US 7,765,048 B2
(45) Date of Patent: Jul. 27, 2010

(54) DECELERATION CONTROL APPARATUS AND METHOD FOR AUTOMOTIVE VEHICLE

(75) Inventors: Tatsuya Suzuki, Kanagawa (JP); Shinji Matsumoto, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 993 days.

(21) Appl. No.: 10/960,705

(22) Filed: Oct. 8, 2004

(65) Prior Publication Data

US 2005/0085985 A1    Apr. 21, 2005

(30) Foreign Application Priority Data

Oct. 15, 2003    (JP)    ............................. 2003-354692

(51) Int. Cl.
G06F 19/00    (2006.01)

(52) U.S. Cl. ............................. 701/70; 701/40; 701/41; 701/43; 701/44; 701/73; 477/47; 477/182; 303/121; 303/138; 303/140; 303/147; 303/185

(58) Field of Classification Search ............. 701/40–44, 701/73, 80, 446; 180/446, 40–44, 73, 80; 303/121, 138, 140, 147, 185; 477/47, 182

See application file for complete search history.

(56) References Cited

U.S. PATENT DOCUMENTS

| 5,276,624 | A | * | 1/1994 | Ito et al. ....................... 701/72 |
|---|---|---|---|---|
| 5,315,295 | A | * | 5/1994 | Fujii ........................... 340/936 |
| 6,081,761 | A | | 6/2000 | Harada et al. |
| 6,208,927 | B1 | | 3/2001 | Mine et al. |
| 6,216,079 | B1 | * | 4/2001 | Matsuda ....................... 701/70 |
| 6,311,123 | B1 | | 10/2001 | Nakamura et al. |
| 6,385,528 | B1 | | 5/2002 | Takahashi |
| 6,456,924 | B1 | * | 9/2002 | Schmitt et al. ................. 701/82 |
| 2007/0145819 | A1 | * | 6/2007 | Lin et al. ..................... 303/146 |

FOREIGN PATENT DOCUMENTS

| GB | 2 343 016 A | 4/2000 |
|---|---|---|
| JP | 9-240314 A | 9/1997 |
| JP | 10-278762 A | 10/1998 |
| JP | 10-287148 A | 10/1998 |
| JP | 11-83501 A | 3/1999 |
| JP | 11-94072 A | 4/1999 |
| JP | 2000-67398 A | 3/2000 |
| JP | 2000-127798 A | 5/2000 |
| JP | 2001-93090 A | 9/2000 |
| JP | 2001-47996 A | 2/2001 |
| JP | 2001-93094 A | 4/2001 |
| JP | 2001-322449 A | 11/2001 |
| JP | 3658519 B2 | 3/2005 |
| WO | WO 01/87662 | * 11/2001 |

* cited by examiner

*Primary Examiner*—Tuan C To
*Assistant Examiner*—Redhwan Mawari
(74) *Attorney, Agent, or Firm*—Foley & Lardner LLP

(57) ABSTRACT

In deceleration control apparatus and method for an automotive vehicle, a deceleration control is performed on the basis of a turning of the vehicle; and a controlled variable of the deceleration control is decreased when the vehicle is traveling on an outlet of a curved road.

22 Claims, 7 Drawing Sheets

DECELERATION CONTROL APPARATUS AND METHOD FOR AUTOMOTIVE VEHICLE

BACKGROUND OF THE INVENTION

1. Field of the Invention

The present invention relates to deceleration control apparatus and method for an automotive vehicle in which a vehicular deceleration control is carried out for the vehicle which is turning on a curved road.

2. Description of the Related Art

A Japanese Patent Application First Publication No. Heisei 10-278762 published on Oct. 20, 1998 (which corresponds to a U.S. Pat. No. 6,081,761 issued on Jun. 27, 2000 exemplifies a previously proposed deceleration control apparatus for an automotive vehicle in which a safety vehicle speed is calculated from a motion state of the vehicle or driving operation of the vehicle and, when the vehicle speed has reached to its safety vehicle speed, the vehicle is automatically decelerated below the safety vehicle speed to prevent a spin, a drift out, or a roll over.

SUMMARY OF THE INVENTION

Although a case where the vehicle is turned at an inlet of a curved road and a case where the vehicle is turned at an outlet of the curved road are the same in terms of the vehicular turning state but are different in the subsequent road state (shape or so forth). Hence, if the same deceleration control is carried out in the cases of the inlet and the outlet of the curved road, an unpleasant feeling is given to the driver of the vehicle. For example, the deceleration control on the curved road gives a speed lost feeling or insufficient acceleration feeling to the vehicle driver.

It is, therefore, an object of the present invention to provide deceleration control apparatus and method for an automotive vehicle in which the deceleration control carried out on the curved road gives an unpleasant feeling to the vehicle driver.

The above-described object can be achieved by providing a deceleration control apparatus for an automotive vehicle, comprising: a deceleration controlling section that performs a deceleration control on the basis of a turning of the vehicle; and a controlled variable decreasing section that decreases a controlled variable of the deceleration control when the vehicle is traveling on an outlet of a curved road.

The above-described object can also be achieved by providing a deceleration control method for an automotive vehicle, comprising: performing a deceleration control on the basis of a turning of the vehicle; and decreasing a controlled variable of the deceleration control when the vehicle is traveling on an outlet of a curved road.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
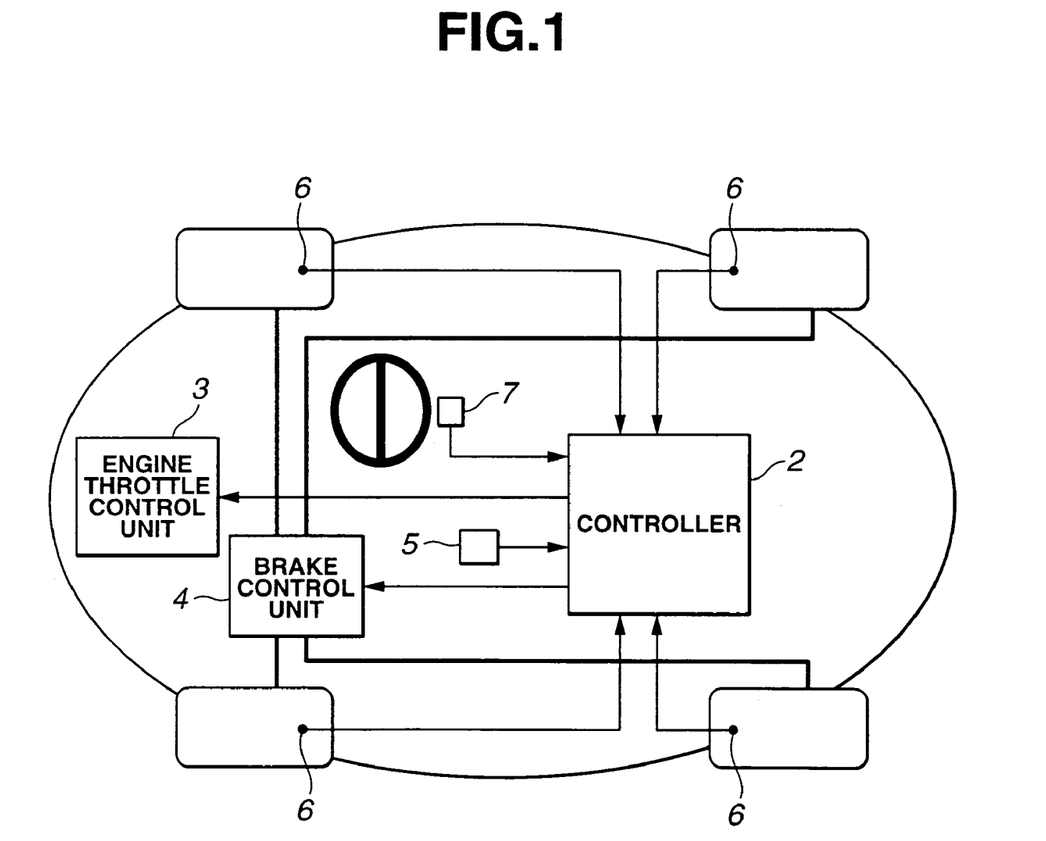
FIG. 1 is a rough configuration view of an automotive vehicle to which a preferred embodiment of a deceleration control apparatus according to the present invention is applicable.

FIG. 1 shows an automotive vehicle to which a deceleration control apparatus according to the present invention is applicable. This vehicle includes a controller 2, an engine throttle control unit 3, a brake control unit 4, a yaw rate sensor 5, road wheel velocity sensors 6, and steering angle sensors 7. engine throttle control unit 3 is constructed to independently control an engine throttle (not shown) of a manipulation of a vehicle driver. A brake control unit 4 is constructed to independently control a brake mechanism of a manipulation of the vehicle driver. A yaw rate sensor 5 detects a yaw rate of the vehicle. A vehicle speed pulse 6 detects road wheel velocity of each road wheel of the vehicle. A steering angle sensor 7 detects a steering angle of a steering wheel of the vehicle. Results of detections of these sensors 5, 6, and 7 are outputted to controller 2.

Controller 2 is constructed to control each part of the vehicle. Controller 2 controls each part on the basis of the result of detections of each sensors 5, 6, and 7. This controller 2 executes the deceleration control automatically in a case where the curved road is turned. In this deceleration control, controller 2 outputs command signals to engine throttle control unit 3 and brake control unit 4 in accordance with a target deceleration during an intervention of the control. Thereby, engine throttle control unit 3 controls an opening angle of the throttle valve. In addition, brake control unit 4 controls the brake mechanism, specifically, a brake liquid pressure.

Figure 2:
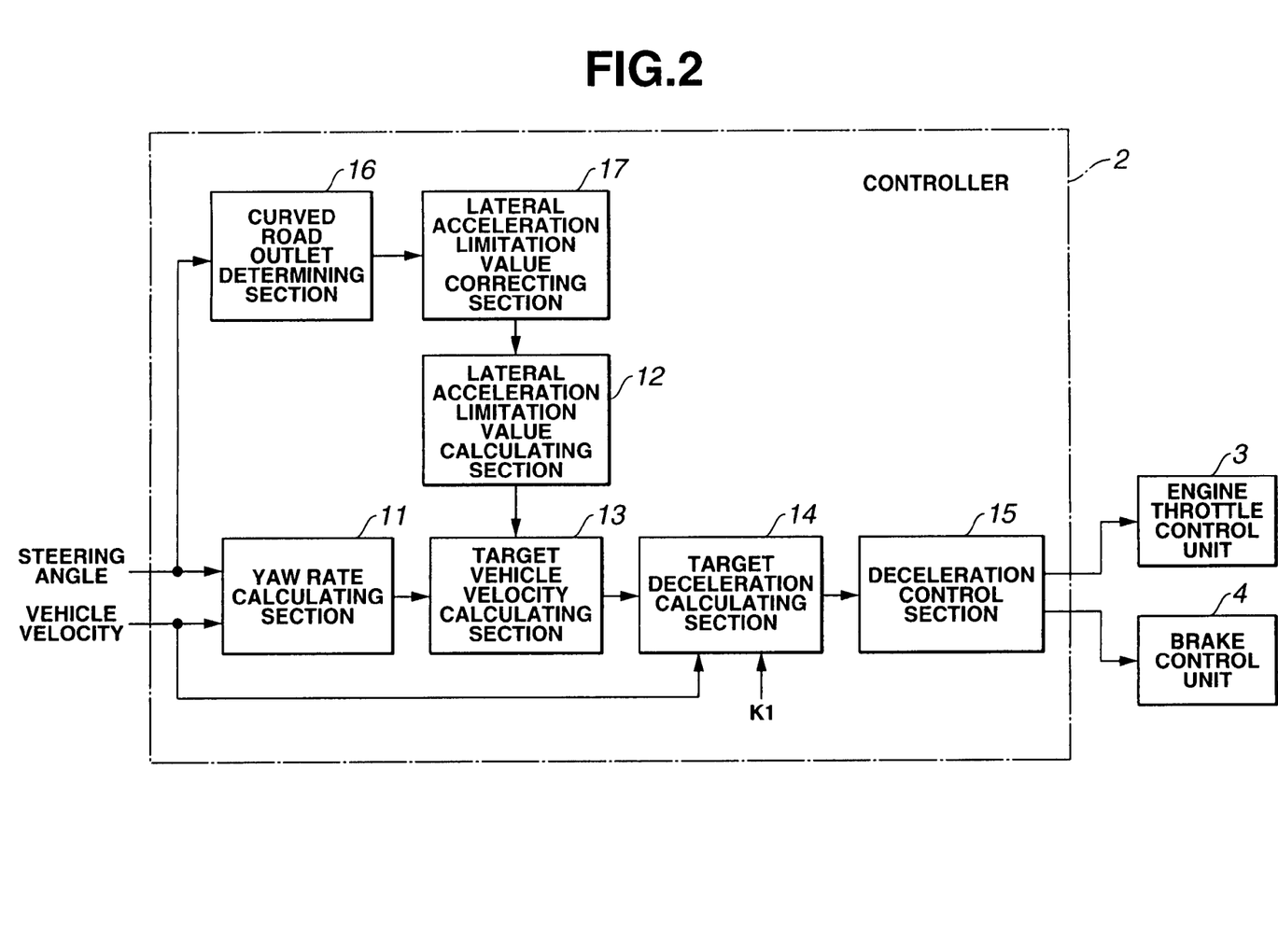
FIG. 2 is a functional block diagram of a controller shown in FIG. 1.
Figure 3:
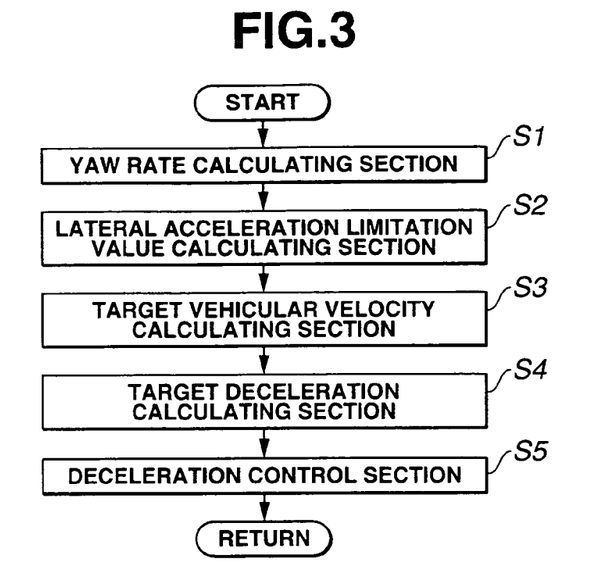
FIG. 3 is a flowchart representing a basic procedure of a deceleration control of the deceleration control apparatus shown in FIG. 1.

Next, a processing that controller 2 executes will be described in details. FIG. 2 shows a structure (in terms of functions) controller 2. As shown in FIG. 2, controller 2 functionally includes: a yaw rate calculating section 11, a lateral acceleration limitation value calculating section 12, a target vehicular velocity calculating section 13, a target deceleration calculating section 14, a deceleration control section 15, a curved road outlet determining (or detecting) section (or corner outlet determining section) 16, and lateral acceleration limitation value correcting section 17. The contents of processing of each part of controller 2 will be described in details using FIG. 3. That is to say, FIG. 3 shows a sequence of each section described above.

Figure 4:
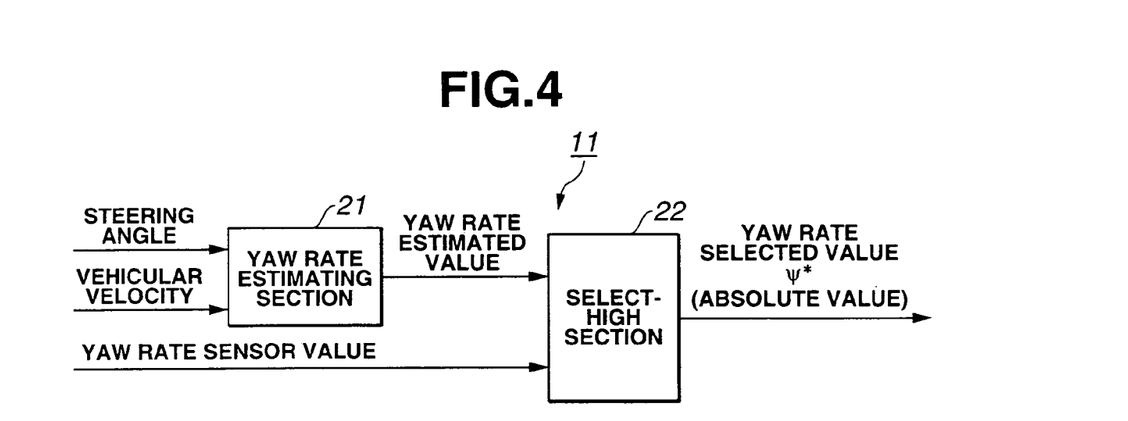
FIG. 4 is a functional block diagram representing a structure of a yaw rate calculating section shown in FIG. 2.
Figure 5:
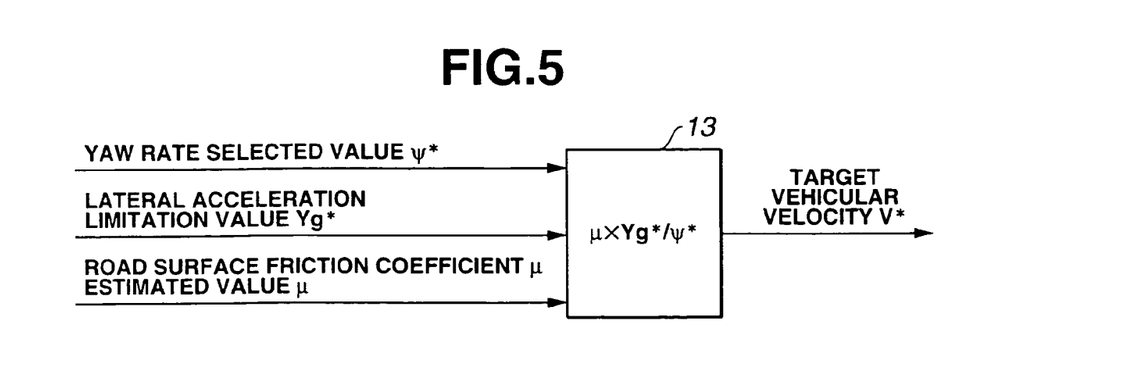
FIG. 5 is a functional block diagram of a target vehicular velocity calculating section shown in FIG. 2.

First, at a step S1, yaw rate calculating section 11 calculates the yaw rate. FIG. 4 shows a structure of the yaw rate calculating section 11 in order to calculate the yaw rate. As shown in FIG. 4, yaw rate calculating section 11 includes a yaw rate estimating section 21 and a select-high section 22. Yaw rate calculating section 11 estimates the yaw rate on the basis of the vehicular velocity detected by means of road wheel speed sensors 6 and the steering angle detected by means of the steering angle sensor 7. The estimation of the yaw rate is carried out in a generally known method. Yaw rate calculating section 11 outputs the estimated yaw rate (hereinafter, a yaw rate estimated value) to select-high section 22.

The select-high section 11 carries out a selection of one of the yaw rate estimated value derived from yaw rate calculating section 11 and a yaw rate actually measured value detected by yaw rate sensor 5 which is larger than (or higher than) the other. In general, the estimated value of the yaw rate estimated on the basis of the steering angle can be early detected as compared with the yaw rate actually measured value by means of yaw rate sensor 5. However, there is a case where, during a vehicular run on a low frictional coefficient road, a vehicular behavior (motion) is varied in a direction at which the yaw rate is increased with the steering angle is not so wide (for example, in a case of a slow spin mode). Thus, the select-high calculation is carried out from the yaw rate estimated value and the yaw rate actually measured value so that the actually measured yaw rate can be selected and in a case where the yaw rate actually measured value is larger than the yaw rate estimated value, this yaw rate actually measured value is selected. Thus, the deceleration control can be intervened at an early stage.

Yaw rate calculating section 11 outputs the yaw rate selected by the select-high method in select-high section 22 as a yaw rate selected value $\psi^*$ (>0) to target vehicular velocity calculating section 13. At the next step S2, lateral acceleration limitation value calculating section 12 calculates lateral acceleration limitation value $Yg^*$. Lateral acceleration limitation value $Yg^*$ is a limitation value of a target lateral acceleration for the vehicle to travel within the curved road without the spin, drift out, or roll over. Lateral acceleration limitation value calculating section 12 this lateral acceleration limitation value $Yg^*$ to be a target lateral acceleration $Yga$. This target lateral acceleration $Yga$ is, for example, 0.45 G. Lateral acceleration limitation value calculating section 12 outputs the calculated lateral acceleration limitation $Yg^*$ to target vehicle velocity calculating section 13.

As will be described hereinafter, the present invention is applicable so that, in a case where the vehicle is traveling through a curved road outlet, this lateral acceleration limitation value $Yg^*$ is corrected. Next, at a step S3, target vehicular velocity calculating section 13 calculates a target vehicular velocity $V^*$. Specifically, target vehicular velocity calculating section 13 calculates the target vehicular velocity $V^*$ in accordance with equation (1) on the basis of lateral acceleration limitation value $Yg^*$ calculated by lateral acceleration limitation value at step S2 an estimated value $\mu$ of a road surface frictional coefficient $\mu$ on the basis of the following equation (1).

$$V^* = \mu \times Yg^*/\phi^* \qquad (1)$$

According to the equation (1), as the road frictional coefficient $\mu$ is reduced, target vehicle velocity $V^*$ becomes small. As the lateral acceleration limitation value $Yg^*$ becomes small, target vehicle velocity $V^*$ becomes small. As the yaw rate selected value $\psi^*$ becomes large, target vehicular velocity $V^*$ becomes small. At the next step S4, target deceleration value calculating section 14 calculates target deceleration $Xg^*$ according to equation (2).

$$Xg^* = K1 \times \Delta V/\Delta t \qquad (2).$$

In equation (2), $\Delta V$ denotes a difference value (speed deviation value) which is a subtraction of target vehicle velocity $V^*$ calculated by target vehicle velocity calculating section 13 from vehicle velocity V ($\Delta V = V - V^*$), $\Delta t$ denotes a predetermined period of time, and K1 denotes a gain. According to equation (2), as the value of $\Delta V$ becomes large, namely, as the difference between vehicle speed V and target vehicle speed $V^*$ is larger in a positive direction, target deceleration $Xg^*$ becomes also large. If equation (1) is used, since $\Delta V$ becomes large if yaw rate $\psi^*$ becomes large, target deceleration $Xg^*$ becomes large. Target deceleration calculation section 14 outputs calculated target deceleration $Xg^*$ to deceleration control section 15. Next, at a step S5, deceleration control section 15 controls engine throttle control unit 3 and brake control unit 4 in such a way that the actual deceleration indicates target deceleration $Xg^*$.

Figure 6:
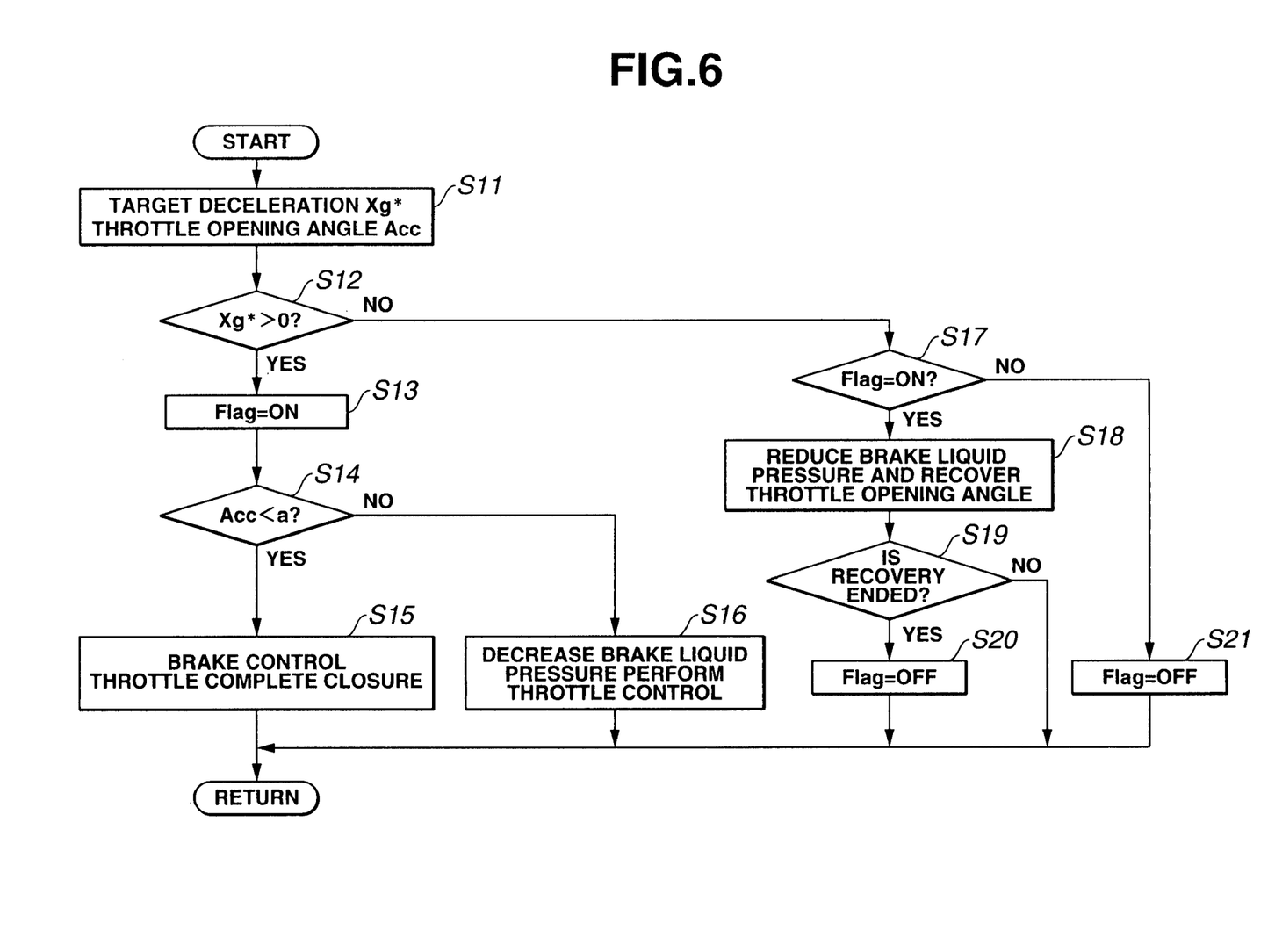
FIG. 6 is a flowchart representing a processing flow of a deceleration control section shown in FIG. 2.

FIG. 6 shows this processing procedure of deceleration controlling section 15. First, at a step S11, target deceleration $Xg^*$ and opening angle of engine throttle valve Acc. It is noted that the throttle opening angle Acc is a throttle opening variable corresponding to an accelerator operating variable with the vehicle driver. At the next step S12, deceleration control section 15 determines whether target deceleration $Xg^*$ is larger than zero. That is to say, if deceleration controlling section 15 determines that target deceleration $Xg^*$ is larger requires a value requiring the deceleration, the routine goes to a step S13. On the other hand, if target deceleration $Xg^*$ is equal to or lower than zero ($Xg^* \leq 0$), namely, target deceleration $Xg^*$ becomes a value requiring an acceleration, the routine goes to a step S17.

At step S13, deceleration controlling section 15 sets a deceleration control flag Flag to ON (Flag=ON). Then, deceleration controlling section 15 sets deceleration control flag Flag to ON (Flag=ON) and the routine goes to a step S14. At step S14, deceleration controlling section 15 determines whether throttle opening angle Acc is smaller than a predetermined value a. If throttle opening angle Acc is narrower than predetermined value a (Acc<a), the routine goes to a step S15. If throttle valve opening angle Acc is equal to or wider than predetermined value a (Acc≧a), the routine goes to a step S16.

At a step S15, deceleration control section 15 controls the brake by means of brake control unit 4 so that the deceleration indicates target deceleration $Xg^*$. On the other hand, deceleration controlling section 15 sets the throttle completely open. That is to say, deceleration controlling section 15 maintains the throttle opening angle operated by the driver without performing the engine control by means of engine throttle control unit 3. That is to say, throttle is completely open. Deceleration control section 15 carries out again the processing from step S11.

At step S16, deceleration control section 15 controls the engine through engine throttle control unit 3 and controls the brake through brake control unit 4 so that the deceleration is made equal to target deceleration $Xg^*$ and controls the brake through brake control unit 4. Specifically, brake control unit 4 is used to operate the brake (namely, the brake liquid pressure is made high). On the other hand, engine throttle control unit 3 is used to suppress the throttle opening angle for the accelerator operation with the vehicle driver. At this time, furthermore, brake control unit 4 is used for the brake to be operated constantly, namely, after the brake liquid pressure is increased up to a constant value, the brake liquid pressure is decreased and is finally reduced to zero. Deceleration control section 15 controls the engine and the brake through engine throttle control unit 3 and brake control unit 4 so that the deceleration indicates target deceleration Xg*. Then, deceleration control section 15 carries out the processing again from step S11.

On the other hand, at step S17, deceleration control section 15 determines whether deceleration control flag Flag is set to ON. If deceleration control section 15 determines that deceleration control flag Flag is set to ON (Flag=ON), the routine goes to a step S18. If deceleration control flag Flag is not set to ON, the routine goes to a step S21. At step S18, deceleration control section 15 controls engine throttle control unit 3 and brake control unit 4 so as to decrease the brake liquid pressure so as to recover the throttle. Specifically, brake control unit 4 gradually decreases the brake liquid pressure by controlling engine throttle valve unit 3 and brake control unit 4 and engine throttle control unit 3 gradually recover the throttle opening angle to a value corresponding the accelerator operating variable.

At the next step S19, deceleration control section 15 determines whether the recoveries of the decreased pressure of the brake liquid pressure and throttle valve have gradually been completed. If deceleration control section 15 determines that the recoveries of the decreased pressure of the brake liquid pressure and the engine throttle have been completed, the routine goes to a step S20. At step S20, deceleration control flag Flag is set to be OFF and the processing from step S11 is again carried out. If deceleration control section 15 determines that the recoveries of the decreased pressure of the brake liquid pressure have not been completed, the processing from step S11 is again carried out without resetting flag Flag to OFF. In addition, deceleration control section 15 sets deceleration control flag Flag at step S21 to OFF so that the processing from step S11 is again carried out. As described above, deceleration control section 15 controls engine throttle control unit 3 and brake control unit 4 in such a manner that the actual deceleration indicates target deceleration Xg*. According to the above-described processing, the following deceleration control is, for example, carried out.

If the vehicle is turned on a curved road so that target deceleration Xg* is increased larger than 0 (Xg*>0), the deceleration control is activated so that the actual deceleration indicates target deceleration Xg*. At this time, if throttle opening angle Acc is larger than predetermined value a, the brake (brake liquid pressure) is controlled toward the pressure decrease direction so that the final brake liquid pressure is zeroed. On the other hand, the engine throttle control is carried out (at step S16).

In addition, although target deceleration Xg* is larger than zero when the vehicle is turned on the curved road (Xg*>0), in a case where throttle opening angle Acc by means of the driver is smaller than predetermined value a, for example, the driver does not depress the accelerator (accelerator pedal), the deceleration control only through the bake control, namely, with the brake liquid pressure decreased, the deceleration control so as to decelerate the target deceleration Xg* is carried out (step S15).

Then, if the vehicle has passed through the curved road so that target deceleration Xg* is smaller than zero (Xg*≦0), the brake (brake liquid pressure) is controlled in the pressure decease direction. On the other hand, the accelerator opening angle is recovered up to a quantity corresponding to an accelerator operating variable by the driver. Then, with the accelerator opening angle completely recovered, the deceleration control is ended (step S18). For example, regarding the relationship with road surface frictional coefficient μ, this deceleration control becomes easy to be intervened as the road surface frictional coefficient μ becomes lower. In addition, regarding the relationship with the lateral acceleration limitation value Yg*, this deceleration control becomes easy to be intervened as the lateral acceleration limitation value Yg* becomes smaller. Regarding the relationship with yaw selected value ψ*, the deceleration control becomes easy to be intervened as the yaw rate selected value ψ* becomes larger.

Figure 7:
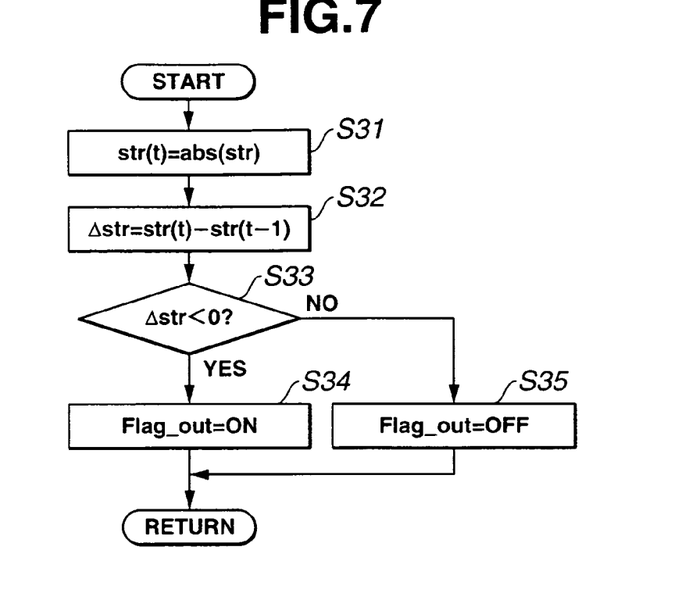
FIG. 7 is an operational flowchart representing a processing flow of a curved road outlet determining (or detecting) section shown in FIG. 2.

Next, a correction of the lateral acceleration limitation value Yg* carried out when the vehicle is traveling through an outlet of the curved road will be explained below. FIG. 7 shows a procedure of determination (or detection) of the curved road outlet by means of curved road outlet determining (or detecting) section 16. At a step S31, curved road output determining section 16 derives an absolute value abs (str) to substitute absolute steering angle abs(str) into a present steering angle value str(t) to derive a difference value. At the next step S32, curved road outlet determining (or detecting) section 16 drives a difference value Δstr by subtracting an immediately before steering angle value str(t−1) from the present steering angle value str(t). If t is assumed to be a sampling time, present steering angle value str(t) is the newest steering angle value and the immediately before steering angle value str(t−1) is the steering angle value obtained immediately before the present steering angle value str(t).

At the next step S33, curved road outlet determining (or detecting) section 16 determines) or detects) whether difference value Δstr obtained at step S32 is smaller than zero. It is noted that the case where difference value Δstr is smaller than zero (Δstr<0) means that the steering angle becomes reduced, namely, the driver returns the steering wheel toward the original position. It is also noted that the case when difference value Δ str is equal to or wider than zero (Δstr<0) means that the steering-angle is maintained or the steering angle is increased, namely, the driver does not operate the steering wheel or the driver operates the steering wheel to increase the steering angle. Curved road outlet determining (or detecting) section 16 determined that difference value Δstr is lower than zero (Δstr<0), the routine goes to a step S34. If Δstr≧0, the routine goes to a step S35.

At step S34, curved road outlet determining (or detecting) section 16 sets a curved road outlet determination flag Flag_out to ON (Flag_out=ON). At step S35, curved road outlet determining (or detecting) section 16 resets curved road outlet determination flag Flag_out to OFF 'Flag_out=OFF). As shown in FIG. 7, curved road outlet determining (or detecting) section 16 performs the processing of the curved road determination (or detection). This curved road outlet determination (detection) processing sets curved road outlet determination flag Flag_out to ON if the driver returns the steering wheel to its original position and sets curved road outlet determination flag Flag_out to OFF if the driver does not operate the steering wheel or if the driver increases the steering angle.

In a case where the turning motion of the vehicle is tried to be stopped due to the approach of the curved road outlet, the driver returns the steering wheel toward its original position (or neutral position). Thus, in a case where the driver returns the steering wheel to its original position, supposing that the vehicle is approaching to the outlet, curved road determining flag Flag_out is turned to ON. Whereas, when the vehicle travels on a substantially straight road (including the vehicle which has completely passed through the curved road) or within the curved road, the driver does not operate the steering wheel or increases the steering angle. Accordingly, in a case where the driver does not handle the steering wheel or the driver increases the steering wheel steering angle, the vehicle can be assumed to travel on the straight road or within the curved road and curved road outlet determination flag Flag_out turns OFF.

Figure 8:
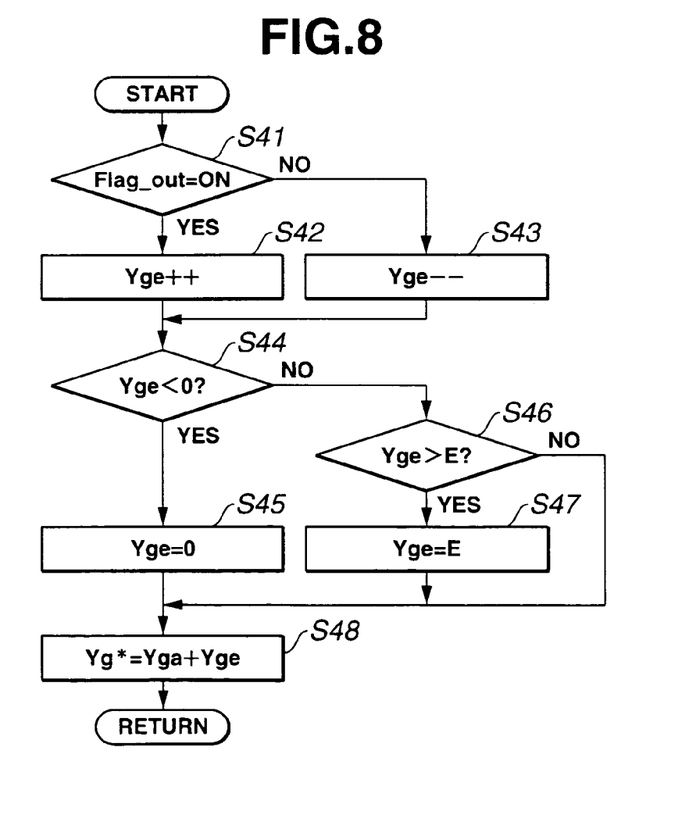
FIG. 8 is an operational flowchart representing a processing flow of a lateral acceleration limitation value correcting section shown in FIG. 2.

FIG. 8 shows the processing procedure of the correction of the lateral acceleration limitation value by means of lateral acceleration limitation value correcting section 17. The correction processing of the lateral acceleration limitation value corrects lateral acceleration limitation value Yg* in accordance with the vehicular travel on the curved road outlet. At a step S41, lateral acceleration limitation value correction section 17 determines whether the curved road outlet determination flag Flag_out is set to ON. The lateral acceleration limitation value correction section 17 goes to a step S42 if curved road outlet determination flag Flag_out is set to ON (Flag_out=ON). If curved road determining flag Flag_out is not turned to ON (Flag_out=OFF), the routine goes to a step S43.

At step S42, lateral acceleration limitation value correction section 17 counts up the correction quantity (hereinafter, referred to as a first lateral acceleration limitation value correction quantity) Yge for the lateral acceleration limitation value Yg*. Then, lateral acceleration limitation value correction section 17 goes to a step S44. At step S43, lateral acceleration limitation value correction section 17 counts down the first lateral acceleration limitation value Yge. Then, lateral acceleration limitation value correcting section 17 goes to a step S44. It is noted that first lateral acceleration limitation value Yge has the initial value of 0 and is varied by a predetermined quantity by means of count up or count down.

At step S44, lateral acceleration limitation value correcting section 17 determines whether first lateral acceleration limitation value correcting quantity Yge is smaller than zero. It is noted that lateral acceleration limitation value correcting section 17 goes to a step S45 if first lateral acceleration limitation value correcting quantity Yge is lower than zero (Yge<0) and goes to a step S46 if first lateral acceleration limitation value correcting quantity Yge is equal to or larger than zero (Yge≧0). At a step S45, lateral acceleration limitation value correcting section 17 sets first lateral limitation value correcting quantity Yge to zero. Then, lateral acceleration limitation value correcting section 17 goes to a step S48.

At a step S46, lateral acceleration limitation value correcting section 17 determines whether first lateral acceleration limitation value correction quantity Yge is larger than a predetermined value (upper limit value) E. It is noted that if first lateral acceleration limitation value correction quantity Yge is larger than a predetermined value E (Yge>E), the routine goes to a step S47 and if first lateral acceleration limitation value Yge is equal to or lower than a predetermined value E (Yge≦E), the routine goes to a step S48.

At a step S47, lateral acceleration limitation value correcting section 17 substitutes predetermined value E into first lateral acceleration limitation value correction quantity Yge. Then, lateral acceleration limitation value correcting section 17 goes to a step S48. At step S48, lateral acceleration limitation value setting section 17 corrects lateral acceleration limitation value Yg* calculated by lateral acceleration limitation calculating section 12 at step S2.

$$Yg^* = Yga + Yge \quad (3).$$

As shown in FIG. 8, lateral acceleration limitation value correcting section 17 performs a processing of target lateral acceleration correction. This processing of the target deceleration correction causes first lateral acceleration limitation value correction quantity Yge to be counted up to become large and to be increased with predetermined value E as a limit if curved road outlet determination flag Flag_out. In addition, in a case where curved road outlet determination flag Flag_out is set to OFF, first lateral acceleration limitation value correction quantity Yge is counted down so as to become small and is decreased with zero as the limit. Thus, only an interval during which curved road outlet determination flag Flag_out is turned to ON, first lateral acceleration limitation value correction quantity Yge becomes large, thus, lateral acceleration limitation value Yg* becomes large. A relationship between lateral acceleration limitation value Yg* and target deceleration Xg* which is the target value to control engine throttle control unit 3 and brake control unit 4 will be described below.

As described above, target vehicular velocity V* is varied in accordance with lateral acceleration limitation value Yg*. For example, as lateral acceleration limitation value Yg* becomes smaller, target vehicular velocity V* becomes smaller (refer to the above-described equation (1)). Then, target deceleration Xg* is varied in accordance with target vehicular velocity V* and, for example, as target vehicular velocity V* becomes smaller, target deceleration becomes large (refer to equation (2)). Thus, target deceleration Xg* is varied in accordance with lateral acceleration limitation value Yg*. As lateral acceleration limitation value Yg*, target deceleration Xg* becomes large. As lateral acceleration limitation value Yg* becomes larger, target deceleration Xg* becomes smaller.

Hence, in a case where curved road outlet determination flag Flag_out is set to ON, namely, the driver returns the steering wheel to its original position, lateral acceleration limitation value Yg* is corrected to become larger. Therefore, consequently, in a case where the vehicle is traveled through the outlet of the curved road, the deceleration control is suppressed or the intervention of the deceleration control is suppressed by means of engine throttle control unit 3 and brake control unit 4. Thus, a smooth rise in the vicinity to the curved road outlet can be achieved. This can prevent the deceleration control at the curved road outlet from giving a constraint feeling or unpleasant feeling to the vehicle driver.

The deceleration control apparatus performs the deceleration control by means of an ordinary controlled variable within the curved road which is remote from the outlet. Thus, the vehicular safety travel can be carried out and, in the vicinity to the outlet of the curved road, the deceleration control can be prevented from giving the constraint feeling or unpleasant feeling to the vehicle driver. As described above, the deceleration control apparatus in the embodiment has been described. However, the present invention is not limited to the embodiment described above.

Figure 9:
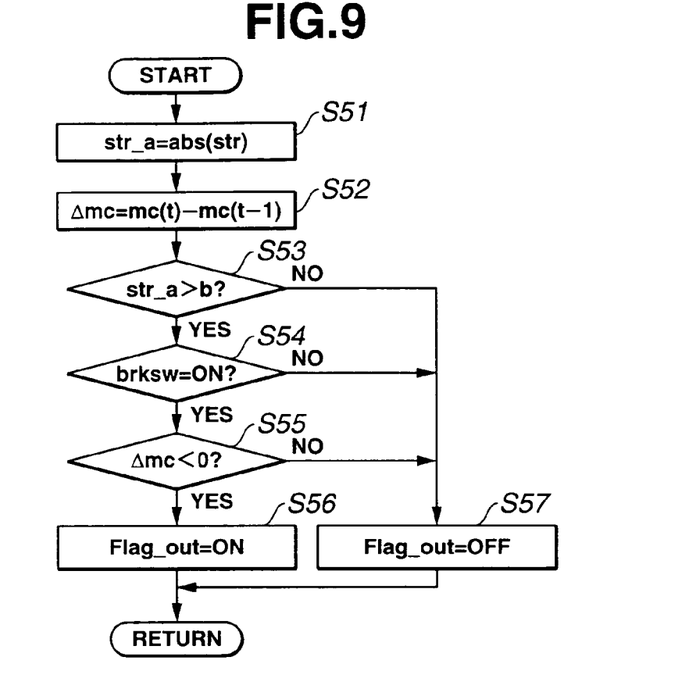
FIG. 9 is an operational flowchart representing another processing flow of the curved road outlet determining (or detecting) section.

That is to say, in the above-described embodiment, the outlet of the curved road is determined on the basis of the steering angle of the steering wheel obtained by the driver's manipulation of driving (refer to FIG. 7). However, the present invention is not limited to this. The determination of the outlet of the curved road may be made on the basis of another manipulation of the driver than the steering wheel. For example, the outlet of the curved road may be determined on the basis of the acceleration manipulation of the vehicle driver. FIG. 9 shows a processing procedure of the outlet determination of the curved road on the basis of the acceleration operation of the driver as the driving operation of the driver. FIG. 9 shows a processing procedure of the curved road determination on the basis of the acceleration operation with the vehicle driver.

At a step S51, curved road outlet determining section 16 drives the absolute value of abs(str) of steering angle str and substitutes this steering angle absolute value abs(str) into steering wheel angle str_s. At a step S52, curved road determining (or detecting) section 16 subtracts an immediate prior value mc(t−1) of a master cylinder pressure from a brake master cylinder pressure mc(t) to derive a difference value Δmc. The immediate prior value mc(t−1) of the master cylinder pressure is a master cylinder pressure obtained at a time immediately before the present value mc(t) of the master cylinder pressure in a case where t denotes a sampling value. At a step S53, curved road determining section 16 determines whether steering angle str_a obtained at step S51 is larger than a predetermined value b. It is noted that, in a case where steering angle value str_a is larger than a predetermined value b, the steering wheel is steered by a constant quantity.

Curbed road outlet determining section 16 goes to a step S54 if steering angle str_a is larger than a predetermined value b (str_a>b) and goes to a step S57 if steering angle str_a is equal to or lower than predetermined value b (str_a≦b). At step S54, curved road outlet determining (or detecting) section 16 determines whether a brake brksw is ON. Curved road outlet determining (or detecting) section 16 goes to a step S55 if brake brksw is turned to ON. If brake brksw is not ON (brake brksw is OFF), the routine goes to a step S57.

At step S55, curved road outlet determining (or detecting) section 16 determines (or detects) whether difference value Δmc of the master cylinder pressure derived at step S52 is smaller than zero It is noted that the case wherein difference value Δmc of master cylinder pressure derived at step S52 is smaller than zero is a case where the brake is releasing from a state wherein the brake is applied. Curved road outlet determining (or detecting) section 16 goes to a step S56 if difference value Δmc is smaller than 0 (Δmc<0) and goes to a step S57 if diffderence value Δmc of the master cylinder pressure is equal to or larger than zero (Δmc≧0).

At a step S56, curved road determining section 16 turns curved road outlet determination flag Flag_out to ON (Flag_out=ON). In addition, at step S57, curved road outlet determining (or detecting) section 16 turns curved road outlet determination flag Flag_out to OFF (Flag_out=OFF). As shown in FIG. 9, curved road outlet determination (or detection) is carried out by means of curved road outlet determining (or detecting) section 16. According to the curved road outlet determining (detecting) processing, in a case where the driver releases from a state in which the driver has depressed the brake pedal (steps S54 and S55) and under a state (step S53) in which the driver steers the steering wheel by a constant quantity, curved road outlet determination flag Flag_out is turned to ON (Flag_out=ON). In a case where the driver does not steer the steering wheel by the constant quantity, in a case where the driver does not depress the brake pedal, or in a case where the driver does not release the brake pedal although the driver has depressed the brake pedal, curved road outlet determination flag Flag_out to OFF (Flag_out=OFF).

With the driver steered the steering wheel, such a manipulation that the brake is released. This means that the driver is to accelerate the vehicle since the vehicle is approaching to the outlet of the curved road. Hence, with the driver steered the vehicle, the brake is released is assumed to the driver's acceleration of the vehicle. In this case, determining that the vehicle is approaching to the outlet of the curved road, curved road outlet determining (or detecting) section 16 turns curved road outlet determination flag Flag_out to ON (Flag_out=ON). Then, if such a manipulation is not carried out, for example, the vehicle is out of the curved road and curved road outlet determining (or detecting) section 16 turns curved road outlet determination flag Flag_out to OFF.

In this way, on the basis of the acceleration manipulation, the curved road outlet may be determined (detected). Furthermore, the driver's intention to accelerate the vehicle is estimated on the basis of the steering manipulation and brake manipulation. In this way, the curved road outlet may be determined (detected), determining compositely from the driver's various manipulation information. In addition, the outlet of the curved road is not limited to the driver's driving operation. The outlet of the curved road may be determined on the basis of a vehicular behavior such as a yaw rate of the vehicle or the lateral acceleration. For example, in this case, in a case where the yaw rate is decreased, or the lateral acceleration is decreased, curved road outlet determining (detecting) section 16 may determine the outlet of the curved road.

In addition, in the embodiment, target deceleration Xg* has been explained in the case of the calculation using equation (2). However, the present invention is not limited to this. For example, target deceleration Xg* may be calculated using the following equation (4).

$$Xg^* = (K2 \times \Delta V + K3 \times d\Delta V)/\Delta t$$

$$\Delta V = V - V^*$$

$$d\Delta V = \Delta V - \Delta VZ, \text{ wherein } \Delta V > 0 \qquad (4).$$

It is noted that ΔVZ denotes a past value (a sampling value one time prior to ΔV) of ΔV. In addition, Δt denotes a predetermined time, namely, a time for velocity deviation value to be zeroed. K2 and K3 denote gains. Since dΔV denotes the difference value of the velocity deviation value, target deceleration Xg* indicates a value obtained with difference value dΔV taken into account.

Thus, according to equation (1) and equation (4), the increment quantity of target deceleration Xg* with respect to the variation quantity of the yaw selected value ψ* is increased. Hence, in a case where, for example, the driver manipulates the vehicle speedily, the target deceleration instantaneously responds and instantaneously is increased. Consequently, in accordance with the manipulation of the steering wheel, the speedy deceleration control can be achieved.

In addition, in the embodiment described above, the correction of lateral acceleration limitation value has been explained using FIG. 8. However, the present invention is not-limited to this. For example, lateral acceleration limitation value Yg* may be corrected using the following equation (5).

$$Yg^* = Yga + Ygb + Ygc + Ygd \qquad (5).$$

It is noted that, Ygb denotes a correction quantity based on the throttle opening angle (accelerator pedal depression angle) (hereinafter, referred to as a second lateral acceleration limitation value correction quantity), Ygc denotes a correction quantity based on the vehicle velocity (hereinafter, referred to as a third correction quantity of a lateral acceleration limitation value), and Ygd denotes a correction quantity of a fourth correction quantity of the lateral acceleration limitation value.

Figure 10:
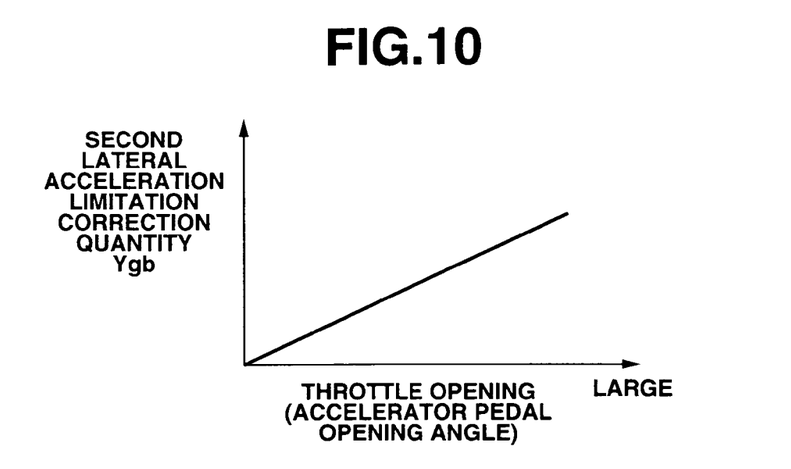
FIG. 10 is a characteristic graph representing a second lateral acceleration limitation value correction quantity Ygb.
Figure 11:
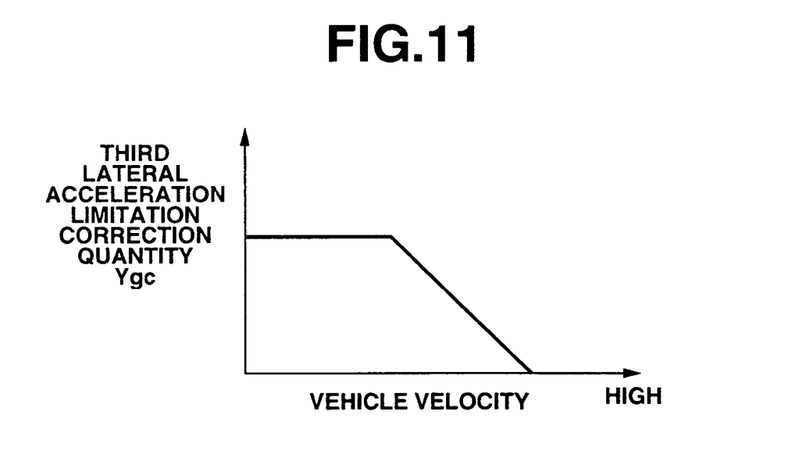
FIG. 11 is a characteristic graph representing a third lateral acceleration limitation value correction quantity Ygc.
Figure 12:
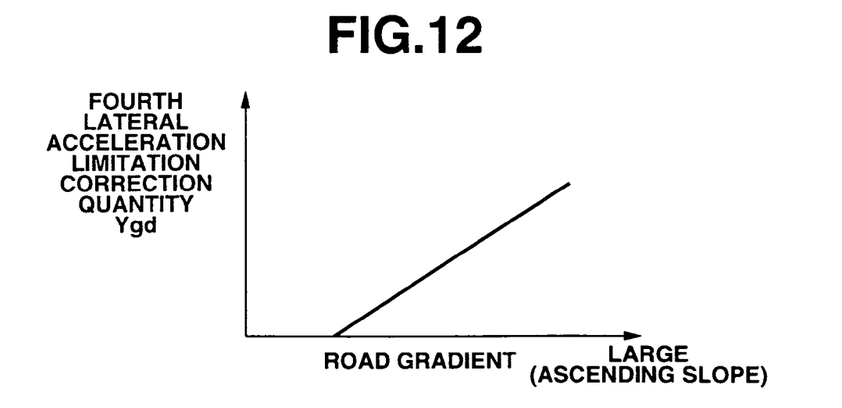
FIG. 12 is a characteristic graph representing a fourth lateral acceleration limitation value correction quantity Ygd.

FIGS. 10 through 12 show characteristics of second through fourth lateral acceleration limitation value correction quantities. As shown in FIG. 10, second lateral acceleration limitation value correction quantity becomes larger in proportion to the throttle valve opening angle (accelerator pedal depression (opening) angle). In addition, as shown in FIG. 11, third lateral acceleration limitation value correction quantity Ygc indicates a constant value until the vehicle velocity indicates a certain value and becomes smaller as the vehicle velocity becomes faster when the vehicle velocity exceeds the certain value. Furthermore, as shown in FIG. 12, fourth lateral acceleration limitation value correction quantity Ygd becomes large according to the road gradient when the road gradient of the vehicular traveling road is to some degree enlarged.

Thus, lateral acceleration limitation value Yg* is corrected to become larger as the throttle opening angle (accelerator pedal opening angle) becomes larger (wider), the vehicle velocity becomes slower, or the road gradient becomes higher (steeper). The correction of lateral acceleration limitation value Yg* is carried out in the same procedure as shown FIG. 8, if curved road outlet determination flag Flag_out is set to ON. For example, lateral acceleration limitation value Yg* is corrected according to first lateral acceleration limitation value correction quantity Yge. However, the correction using second through fourth lateral acceleration limitation value correction quantities Ygb, Ygc, and Ygd are, at this time, simultaneously carried out.

For example, in general, the driver tends to accelerate the vehicle when the vehicle enters the outlet of the curved road. Hence, since lateral acceleration limitation value Yg* is enlarged as the throttle valve opening angle (accelerator pedal opening angle) becomes large so that the intention of the vehicle driver to accelerate the vehicle can be reflected on the correction of lateral acceleration limitation value Yg*. Thereby, the vehicle suppresses the deceleration control on the curved road outlet by reflecting the driver's intention on the travel on the curved road outlet so that a smooth acceleration can be achieved.

In addition, in a case where the vehicle turns with a radius of turning reduced such as a U turn on the road, the driver tends to carry out this turning at a low speed. Hence, since lateral acceleration limitation value Yg* is enlarged as the vehicle velocity becomes slow, the intention of the driver to operate the vehicle at the low speed can be reflected on the correction of lateral acceleration limitation value Yg*. Thus, since the intention of the driver is reflected on the deceleration control so that, in the U-turn driving, the intervention of the deceleration control is suppressed and the smooth U-turn can be achieved.

In addition, if the accelerator is released on the vehicular travel on an ascending slope, the vehicle is largely decelerated as compared with the vehicular travel on a flat road. Hence, by enlarging lateral acceleration limitation value Yg* as the road gradient becomes steep (large). Even if the accelerator pedal is released on the ascending slope, the large deceleration can be prevented. Even if the traveling road is the curved road with the large road gradient (ascending slope), the intention of the vehicle driver is reflected so that the deceleration control is suppressed at the outlet of the curved road so that the smooth acceleration of the vehicle can be achieved. In addition. With the road frictional coefficient $\mu$ as the estimated value taken into consideration, target vehicle velocity V* calculated at step S4 may be corrected.

Figure 13:
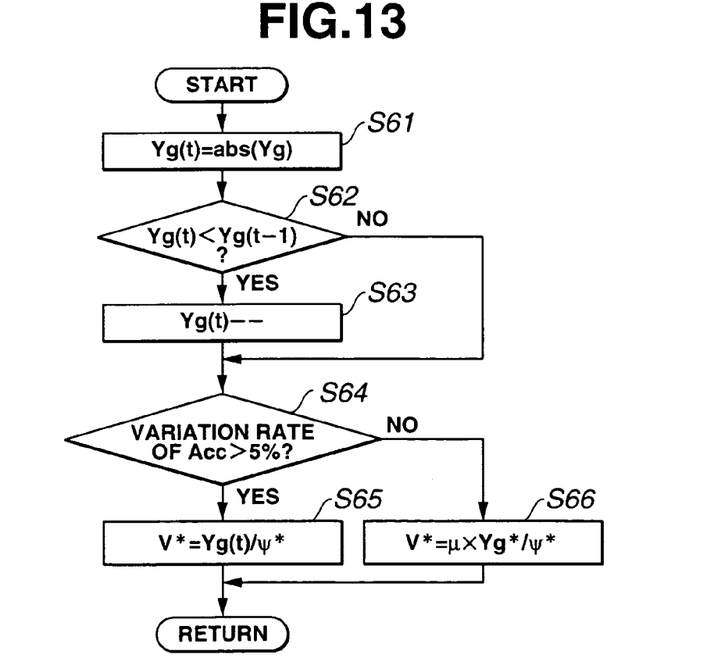
FIG. 13 is an operational flowchart representing a processing flow of a target vehicular velocity with an estimated road surface frictional coefficient μ taken into consideration.

FIG. 13 shows a procedure of the correction of target vehicle velocity V*. This correction is carried out by, for example, target vehicular velocity calculating section 13. At step S61, target vehicle velocity calculating section 13 derives an absolute value abs (Yg) of lateral acceleration Yg detected by means of, for example, lateral acceleration sensor (not shown) and substitutes lateral acceleration absolute value abs(Yg) into present lateral acceleration Yg(t). At next step S62, target vehicle velocity calculating section 13 determines whether present lateral acceleration Yg(t) derived at step S91 is smaller than an immediately prior lateral acceleration Yg(t−1). Suppose that t denotes the sampling time. Present lateral acceleration Yg(t) denotes a latest lateral acceleration. Immediately prior lateral acceleration Yg(t−1) is the lateral acceleration obtained immediately before present lateral acceleration Yg(t). That is to say, target vehicular velocity calculating section 13 determines whether lateral acceleration Yg is increased at a step S62.

Target vehicle speed calculating section 13 goes to a step S63 if present lateral acceleration Yg(t) is smaller than immediately prior acceleration Yg(t−1) (Yg(t)<Yg(t−1)), namely, lateral acceleration Yg is decreasing. If present lateral acceleration Yg(t) is equal to or larger than immediately prior lateral acceleration Yg(t−1), viz., lateral acceleration is increased, the routine goes to a step S64.

At step S63, target vehicular velocity calculating section 13 counts down by a predetermined quantity present lateral acceleration Yg(t) and the routine goes to step S64. AT step S64, target vehicular velocity calculating section 13 determines whether the increase or decrease quantity of the throttle opening angle Acc is larger than 5%. That is to say, target vehicular velocity calculating section 13 determines whether the driver manipulates the accelerator at a constant quantity.

If the increase or decrease quantity of the throttle opening angle Acc is larger than 5% (the variation rate of Acc>5%), namely, the driver constantly manipulates the accelerator pedal, the routine goes to a step S65. If the increase or decrease quantity of throttle valve is equal to or smaller than 5% (Acc increase or decrease quantity≦5%), namely, the driver does not manipulate the accelerator at the constant quantity, the routine goes to a step S66.

At step S66, target vehicular velocity calculating section 13 calculates target vehicular velocity V* using equation (6).

$$V^* = Yg(t)/\psi^* \tag{6}$$

That is to say, as appreciated from a comparison between equation (1) and equation (6), at step S65, target vehicular velocity V* is calculated by replacing a value of $\mu \times Yg^*$ with a lateral acceleration actually developed on the vehicle.

As shown in FIG. 13, target vehicular velocity calculating section 13 corrects target vehicle velocity V*. This correction processing of target vehicular velocity V* calculates target vehicular velocity V* according to equation (6) without use of road surface frictional coefficient $\mu$ in a case where the driver manipulates the accelerator at the constant quantity. As described above, road surface frictional coefficient $\mu$ used in equation (1) is an estimated value, there is often separated from an actual road surface frictional coefficient $\mu$ due to an estimation error. For example, in a case where estimated road surface frictional coefficient is very smaller than actual road frictional coefficient $\mu$, target vehicular velocity V* is estimated to be a small value according to equation (1). In this case, target deceleration Xg* is calculated to be a large value. Consequently, the deceleration due to the deceleration control becomes large. This makes the driver give the constraint feeling due to the deceleration control.

In a case where the constraint feeling is given by the driver in a state where the estimated road surface $\mu$ is very smaller than actual road surface frictional coefficient $\mu$, the driver grasps actual road surface frictional coefficient $\mu$ from the vehicular motion (behavior) and often accelerates the vehicle through the driving manipulation such as an accelerator manipulation even under a turning of the vehicle. From the above-described tendency, in a case where the driver manipulates the accelerator at the constant quantity during the turn of the vehicle, estimating that the estimation error in the estimated value in road surface frictional coefficient becomes large, target vehicular velocity V* is calculated without use of the estimated value of road surface frictional coefficient $\mu$. At this time, target vehicular velocity V* is calculated as a target value of actual lateral acceleration Yg developed at the vehicle due to the accelerator manipulation as a target value (refer to equation (6)).

This can calculate target vehicle velocity V* on the basis of lateral acceleration Yg by which the vehicle can be turned even if the estimation error occurs in the estimated value of road surface frictional coefficient. Consequently, even in a case where the estimated error occurs in the estimated value of road surface frictional coefficient μ, the deceleration control without giving the constraint feeling to the driver. Then, while the deceleration control is carried out within the curved road along with the vehicle driver's intention, the deceleration control which does not give the constraint feeling to the driver at the outlet of the curved road can be achieved.

It is noted that, in the description of the above-described embodiment, lateral acceleration limitation value correcting section 17 detects that the vehicle is traveling on the outlet of the curved road. In this case, the controlled variable reducing means is constituted which decreases the controlled variable of the deceleration control. In addition, lateral acceleration limitation value correcting section 17 constitutes target lateral acceleration correcting means for correcting lateral acceleration limitation value Yg* which is a predetermined target lateral acceleration on the basis of the driving manipulation (operation) by the driver or the vehicular behavior.

The entire contents of a Japanese Patent Application No. 2003-354692 (filed in Japan on Oct. 15, 2003) are herein incorporated by reference. The scope of the invention is defined with reference to the following claims.

What is claimed is:

1. A deceleration control apparatus for an automotive vehicle, comprising:
    a deceleration controlling section configured to calculate a target vehicle velocity during a turning of the vehicle on a basis of a vehicular motion information generated during the turning of the vehicle and a lateral acceleration limitation value to perform a deceleration control such that a vehicle velocity is controlled to the target vehicle velocity;
    a curved road outlet detecting section configured to detect whether the vehicle is traveling on an outlet of a curved road;
    a section configured to perform a correction of the lateral acceleration limitation value to make the lateral acceleration limitation value larger as vehicle speed becomes lower; and
    a controlled variable decreasing section configured to decrease a controlled variable of the deceleration control by correcting the lateral acceleration limitation value such that the lateral acceleration limitation value, in a case where the curved road outlet detecting section detects that the vehicle is traveling on the outlet of the curved road, is larger than the lateral acceleration limitation value before the outlet of the curved road has been detected while the vehicle is traveling on the curved road; and
    a lateral acceleration limitation value correcting section configured to correct the lateral acceleration limitation value (Yg*) on a basis of a predetermined target lateral acceleration (Yga), a first lateral acceleration limitation value correction quantity (Yge), a second lateral acceleration limitation value correction quantity (Ygb) based on an acceleration opening angle, a third lateral acceleration limitation value correction quantity (Ygc) based on the vehicular velocity, and a fourth lateral acceleration limitation value correction quantity (Ygd) based on a road surface gradient (Yg*=Yga+Ygb+Ygc+Ygd+Yge).

2. A deceleration control apparatus for an automotive vehicle as claimed in claim 1, wherein the curved road outlet detecting section is configured to detect that the vehicle is traveling on the outlet of the curved road on the basis of a driving manipulation by a driver.

3. A deceleration control apparatus for an automotive vehicle as claimed in claim 2, wherein the curved road outlet detecting section is configured to detect that the vehicle is traveling on the outlet of the curved road in a case where the driver manipulates a steered steering wheel of the vehicle to run straightly.

4. A deceleration control apparatus for an automotive vehicle as claimed in claim 2, wherein the curved road outlet detecting section is configured to detect that the vehicle is traveling on the outlet of the curved road in a case where the driver manipulates an accelerator to accelerate the vehicle.

5. A deceleration control apparatus for an automotive vehicle as claimed in claim 1, wherein the curved road outlet detecting section is configured to detect that the vehicle is traveling on the outlet of the curved road on the basis of the vehicular motion.

6. A deceleration control apparatus for an automotive vehicle as claimed in claim 5, wherein the curved road outlet detecting section is configured to detect that the vehicle is traveling on the outlet of the curved road in a case where a yaw rate is decreased.

7. A deceleration control apparatus for an automotive vehicle as claimed in claim 5, wherein the curved road outlet detecting section is configured to detect that the vehicle is traveling on the outlet of the curved road in a case where a lateral acceleration is decreased.

8. A deceleration control apparatus for an automotive vehicle as claimed in claim 1, wherein the deceleration control is performed in order for the vehicle to be turned at a predetermined target lateral acceleration,
    wherein the controlled variable of the deceleration control is set to be small as the predetermined target acceleration becomes large, and
    wherein the deceleration control apparatus further comprises a target lateral acceleration correcting section configured to correct the predetermined target lateral acceleration on a basis of a driving manipulation by a vehicle driver or a vehicular motion.

9. A deceleration control apparatus for an automotive vehicle as claimed in claim 8, wherein the target lateral acceleration correcting section is configured to carry out such a correction that the predetermined target lateral acceleration becomes larger as the driver accelerates the vehicle.

10. A deceleration control apparatus for an automotive vehicle as claimed in claim 8, wherein the target lateral acceleration correcting section is configured to carry out such a correction that, as a vehicle velocity becomes smaller, the predetermined target lateral acceleration becomes larger.

11. A deceleration control apparatus for an automotive vehicle as claimed in claim 8, wherein the target lateral acceleration correcting section is configured to carry out such a correction that, as an ascending slope gradient of the traveling road becomes larger, the predetermined target lateral acceleration becomes larger.

12. A deceleration control apparatus for an automotive vehicle as claimed in claim 1, wherein the deceleration control apparatus is configured so that a road surface frictional coefficient within the curved road is estimated, a predetermined target velocity during a travel on the curved road is calculated on the basis of the estimated curved road surface frictional coefficient, the controlled variable is set on the basis of the predetermined target velocity, and the road surface frictional coefficient is corrected on the basis of a driving manipulation of a vehicle driver.

13. A deceleration control apparatus for an automotive vehicle as claimed in claim 1, wherein the deceleration control apparatus further comprises:
a target vehicular velocity calculating section configured to calculate the target vehicle velocity (V*) on a basis of an estimated value of a road surface frictional coefficient ($\mu$), a yaw rate selected value ($\psi$*), and the lateral acceleration limitation value (Yg*);
a target deceleration calculating section configured to calculate a target deceleration (Xg*) as follows: $Xg^* = K1 \times \Delta V / \Delta t$, wherein K1 denotes a gain, $\Delta V = V - V^*$, wherein V denotes an actual vehicular velocity, and $\Delta t$ denotes a predetermined time; and
a deceleration control section configured to control an engine throttle control unit and a brake control unit in order for an actual deceleration to be made substantially equal to the target deceleration (Xg*).

14. A deceleration control apparatus for an automotive vehicle as claimed in claim 13, wherein the deceleration control apparatus is configured so that the first lateral acceleration limitation value correction quantity (Yge) is counted up until a predetermined value (E) when the curved road outlet detecting section detects that the vehicle is traveling on the outlet of the curved road.

15. A deceleration control apparatus for an automotive vehicle as claimed in claim 1, wherein the deceleration control apparatus further comprises:
a target vehicular velocity calculating section configured to calculate the target vehicle velocity (V*) on a basis of an estimated value of a road surface frictional coefficient ($\mu$), a yaw rate selected value ($\psi$*), and the lateral acceleration limitation value (Yg*);
a target deceleration calculating section configured to calculate a target deceleration (Xg*) as follows: $Xg^* = K1 \times \Delta V / \Delta t$, wherein K1 denotes a gain, $\Delta V = V - V^*$, wherein V denotes an actual vehicular velocity, and $\Delta t$ denotes a predetermined time; and
a deceleration control section configured to control an engine throttle control unit and a brake control unit in such a way that an actual deceleration is made substantially equal to the target deceleration (Xg*).

16. A deceleration control apparatus for an automotive vehicle as claimed in claim 1, wherein the deceleration control apparatus further comprises:
a target vehicular velocity calculating section configured to calculate the target vehicle velocity (V*) on the basis of an estimated value of a road surface frictional coefficient ($\mu$), a yaw rate selected value ($\psi$*), and the lateral acceleration limitation value (Yg*);
a target deceleration calculating section configured to calculate a target deceleration (Xg*) as follows: $Xg^* = (K2 \times \Delta V + K3 \times d\Delta V)/\Delta t$, wherein K2 and K3 denote gains, $\Delta V = V - V^*$, wherein $d\Delta V = \Delta V - \Delta VZ$, wherein $\Delta V > 0$ and $\Delta VZ$ denotes a past value of $\Delta V$, and $\Delta t$ denotes a predetermined time; and
a deceleration control section configured to control an engine throttle control unit and a brake control unit in such a way that an actual deceleration is made substantially equal to the target deceleration (Xg*).

17. A deceleration control apparatus for an automotive vehicle as claimed in claim 1, wherein the deceleration control apparatus further comprises:
a target vehicular velocity calculating section configured to calculate the target vehicle velocity (V*) as follows: $V^* = Yg(t)/\psi^*$, wherein Yg(t) denotes a present lateral acceleration and $\psi$* denotes a selected value of a yaw rate from one of an estimated value of the yaw rate and an actual yaw rate which is larger than the other;
a target deceleration calculating section configured to calculate a target deceleration (Xg*) as follows: $Xg^* = K1 \times \Delta V / \Delta t$, wherein K1 denotes a gain, $\Delta V = V - V^*$, wherein V denotes an actual vehicular velocity, and $\Delta t$ denotes a predetermined time; and
a deceleration control section configured to control an engine throttle control unit and a brake control unit in such a way that an actual deceleration is made substantially equal to the target deceleration (Xg*).

18. A deceleration control apparatus for an automotive vehicle, comprising:
deceleration controlling means for calculating a target vehicle velocity during a turning of the vehicle on a basis of a vehicular motion information generated during the turning of the vehicle and a predetermined lateral acceleration limitation value to perform a deceleration control such that a vehicle velocity is controlled to the target vehicle velocity;
curved road outlet detecting means for detecting whether the vehicle is traveling on an outlet of a curved road;
correction means for performing a correction of the lateral acceleration limitation value to make the lateral acceleration limitation value larger as the vehicle speed becomes lower; and
controlled variable decreasing means for decreasing a controlled variable of the deceleration control by correcting the lateral acceleration limitation value such that the lateral acceleration limitation value, in a case where the curved road outlet detecting means detects that the vehicle is traveling on the outlet of the curved road, is larger than the lateral acceleration limitation value before the outlet of the curved road has been detected while the vehicle is traveling on the curved road; and
a lateral acceleration limitation value correcting section configured to correct the lateral acceleration limitation value (Yg*) on a basis of a predetermined target lateral acceleration (Yga), a first lateral acceleration limitation value correction quantity (Yge), a second lateral acceleration limitation value correction quantity (Ygb) based on an acceleration opening angle, a third lateral acceleration limitation value correction quantity (Ygc) based on the vehicular velocity, and a fourth lateral acceleration limitation value correction quantity (Ygd) based on a road surface gradient ($Yg^* = Yga + Ygb + Ygc + Ygd + Yge$).

19. A deceleration control method for an automotive vehicle, comprising:
performing a deceleration control;
calculating a target vehicle velocity during a turning of the vehicle on a basis of a vehicular motion information generated during the turning of the vehicle and a predetermined lateral acceleration limitation value to perform the deceleration control such that a vehicle velocity is controlled to the target vehicle velocity;
detecting whether the vehicle is traveling on an outlet of a curved road;
performing a correction of the lateral acceleration limitation value to make the lateral acceleration limitation value larger as the vehicle speed becomes lower; and
decreasing a controlled variable of the deceleration control by correcting the lateral acceleration limitation value such that the lateral acceleration limitation value, in a case where the vehicle is detected to be traveling on the outlet of the curved road, is larger than the lateral acceleration limitation value before the outlet of the curved road has been detected while the vehicle is traveling on the curved road; and a lateral acceleration limitation value correcting section configured to correct the lateral acceleration limitation value ($Yg^*$) on a basis of a predetermined target lateral acceleration (Yga), a first lateral acceleration limitation value correction quantity (Yge), a second lateral acceleration limitation value correction quantity (Ygb) based on an acceleration opening angle, a third lateral acceleration limitation value correction quantity (Ygc) based on the vehicular velocity, and a fourth lateral acceleration limitation value correction quantity (Ygd) based on a road surface gradient ($Yg^*$=Yga+Ygb+Ygc+Ygd+Yge).

20. A deceleration control apparatus for an automotive vehicle as claimed in claim 1, wherein the deceleration control apparatus further comprises:

a target vehicular velocity calculating section configured to calculate the target vehicle velocity ($V^*$) on the basis of an estimated value of a road surface frictional coefficient ($\mu$), a yaw rate selected value ($\psi^*$), and the lateral acceleration limitation value ($Yg^*$); and a target deceleration calculating section configured to calculate a target deceleration ($Xg^*$) as follows: $Xg^*$=(K2×$\Delta V$+K3×d$\Delta V$)/$\Delta t$, wherein K2 and K3 denote gains, $\Delta V$=V−$V^*$, wherein d$\Delta V$=$\Delta V$−$\Delta VZ$, wherein $\Delta V$>0 and $\Delta VZ$ denotes a past value of $\Delta V$, and $\Delta t$ denotes a predetermined time.

21. A deceleration control apparatus for an automotive vehicle as claimed in claim 18, wherein the deceleration controlling means further comprises:

a target vehicular velocity calculating means for calculating the target vehicle velocity ($V^*$) on the basis of an estimated value of a road surface frictional coefficient ($\mu$), a yaw rate selected value ($\psi^*$), and the lateral acceleration limitation value ($Yg^*$); and a target deceleration calculating means for calculating a target deceleration ($Xg^*$) as follows: $Xg^*$=(K2×$\Delta V$+K3×d$\Delta V$)/$\Delta t$, wherein K2 and K3 denote gains, $\Delta V$=V−$V^*$, wherein d$\Delta V$=$\Delta V$−$\Delta VZ$, wherein $\Delta V$>0 and $\Delta VZ$ denotes a past value of $\Delta V$, and $\Delta t$ denotes a predetermined time.

22. A deceleration control method for an automotive vehicle as claimed in claim 19, wherein the step of deceleration control further comprises:

calculating the target vehicle velocity ($V^*$) on the basis of an estimated value of a road surface frictional coefficient ($\mu$), a yaw rate selected value ($\psi^*$), and the lateral acceleration limitation value ($Yg^*$); and calculating a target deceleration ($Xg^*$) as follows: $Xg^*$=(K2×$\Delta V$+K3×d$\Delta V$)/$\Delta t$, wherein K2 and K3 denote gains, $\Delta V$=V−$V^*$, wherein d$\Delta V$=$\Delta V$−$\Delta VZ$, wherein $\Delta V$>0 and $\Delta VZ$ denotes a past value of $\Delta V$, and $\Delta t$ denotes a predetermined time.

* * * * *